United States Patent
Co-Reyes et al.

(10) Patent No.: US 12,430,551 B2
(45) Date of Patent: Sep. 30, 2025

(54) REINFORCEMENT LEARNING ALGORITHM SEARCH

(71) Applicant: Google LLC, Mountain View, CA (US)

(72) Inventors: John Dalton Co-Reyes, San Francisco, CA (US); Yingjie Miao, Fremont, CA (US); Daiyi Peng, Cupertino, CA (US); Sergey Vladimir Levine, Berkeley, CA (US); Quoc V. Le, Sunnyvale, CA (US); Honglak Lee, Mountain View, CA (US); Aleksandra Faust, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 1099 days.

(21) Appl. No.: 17/338,093

(22) Filed: Jun. 3, 2021

(65) Prior Publication Data

US 2022/0391687 A1  Dec. 8, 2022

(51) Int. Cl.
  *G06N 3/08* (2023.01)
  *G06F 11/34* (2006.01)
  *G06F 16/901* (2019.01)

(52) U.S. Cl.
  CPC ........... *G06N 3/08* (2013.01); *G06F 11/3428* (2013.01); *G06F 16/9024* (2019.01)

(58) Field of Classification Search
  CPC .... G06N 3/08; G06F 16/9024; G06F 11/3428
  See application file for complete search history.

(56) References Cited

U.S. PATENT DOCUMENTS

| | | | |
|---|---|---|---|
| 2019/0130277 A1* | 5/2019 | Andoni | G06N 3/086 |
| 2019/0180188 A1* | 6/2019 | Liang | G06N 3/086 |
| 2020/0104688 A1* | 4/2020 | Benyahia | G06F 18/24 |

OTHER PUBLICATIONS

Jörg K.H. Franke et al., "Sample-Efficient Automated Deep Reinforcement Learning", Mar. 2021, ICLR, pp. 1-23 (Year: 2021).*

(Continued)

*Primary Examiner* — Brian M Smith
(74) *Attorney, Agent, or Firm* — Fish & Richardson P.C.

(57) ABSTRACT

Methods, computer systems, and apparatus, including computer programs encoded on computer storage media, for generating and searching reinforcement learning algorithms. In some implementations, a computer-implemented system generates a sequence of candidate reinforcement learning algorithms. Each candidate reinforcement learning algorithm in the sequence is configured to receive an input environment state characterizing a state of an environment and to generate an output that specifies an action to be performed by an agent interacting with the environment. For each candidate reinforcement learning algorithm in the sequence, the system performs a performance evaluation for a set of a plurality of training environments. For each training environment, the system adjusts a set of environment-specific parameters of the candidate reinforcement learning algorithm by performing training of the candidate reinforcement learning algorithm to control a corresponding agent in the training environment. The system generates an environment-specific performance metric for the candidate reinforcement learning algorithm that measures a performance of the candidate reinforcement learning algorithm in controlling the corresponding agent in the training environment as a result of the training. After performing training in the set of training environments, the system generates a summary performance metric for the candidate reinforcement learning algorithm by combining the environment-specific performance metrics generated for the set of training environments. After evaluating each of the candidate reinforcement learning algorithms in the sequence, the system selects one or more output reinforcement learning algorithms from the sequence based on the summary performance metrics of the candidate reinforcement learning algorithms.

19 Claims, 5 Drawing Sheets

(56) References Cited

OTHER PUBLICATIONS

Shauharda Khadka et al., "Evolution-Guided Policy Gradient in Reinforcement Learning", Oct. 2018, Curran Associates Inc., pp. 1-15 (Year: 2018).*
Ferran Alet et al., "Meta-Learning Curiosity Algorithms", Mar. 2020, ICLR, pp. 1-22 (Year: 2020).*
Esteban Real et al., "AutoML-Zero: Evolving Machine Learning Algorithms From Scratch", Jun. 2020, JMLR.org (Year: 2020).*
David R. So et al., "The Evolved Transformer", May 2019, IMCL, pp. 1-14 (Year: 2019).*
Aviral Kumar et al., "Conservative Q-Learning for Offline Reinforcement Learning", Aug. 2020, Curran Associates Inc., pp. 1-31 (Year: 2020).*
Martinez, A. et al., "Adaptive multifactorial evolutionary optimization for multitask reinforcement learning," IEEE Trans. on Evolutionary Computation, vol. 26, Iss. 2 (May 24, 2021) pp. 233-247. (Year: 2021).*
Jordan, S. et al., "Evaluating the performance of reinforcement learning algorithms," Proc. of the 37th Intl. Conf. on Machine Learning (Nov. 2020) 12 pp. (Year: 2020).*
Abadi, M. et al., "TensorFlow: a system for large-scale machine learning," Proc. of the 12th USENIX Symp. on Operating Systems Design and Implementation (Nov. 2016) pp. 265-283. (Year: 2016).*
Schulman, J. et al., "Proximal policy optimization algorithms," downloaded from <arxiv.org/abs/1707.06347> (Aug. 28, 2017) 12 pp. (Year: 2017).*
Alet, et al., " Meta-learning curiosity algorithms" arXiv, 2020, 22 pages.
Bello et al., "Neural optimizer search with reinforcement learning" arXiv, 2017, 12 pages.
Bengio et al., "Use of genetic programming for the search of a new learning rule for neural networks" IEEE, 1994, 4 pages.
Bengio et al., "Learning a synaptic learning rule" IJCNN-91-Seattle International Joint Conference on Neural Networks, 1991, 6 pages.
Cai et al., "Efficient architecture search by network transformation" Proceedings of the Thirty-Second AAAI Conference on Artificial Intelligence, 2018, 8 pages.
Bechtle et al., "Meta-learning via learned loss" arXiv, 2019, 12 pages.
Duan et al., "R12: Fast reinforcement learning via slow reinforcement learning" arXiv, 2016, 14 pages.
Elsken et al., "Neural architecture search: A survey" 2018, arXiv, 17 pages.
Faust et al., "Evolving rewards to automate reinforcement learning" arXiv, 2019, 13 pages.
Finn et al., "Meta-learning and universality: Deep representations and gradient descent can approximate any learning algorithm" arXiv, 2018, 20 pages.
Finn et al., "Model-agnostic meta-learning for fast adaptation of deep networks" arXiv, 2017, 13 pages.
Franke et al., "Sample-efficient automated deep reinforcement learning" ICLR, 2021, 23 pages.
Fujimoto et al., "Addressing function approximation error in actorcritic methods" arXiv, 2018, 15 pages.
Goldberg et al., "A comparative analysis of selection schemes used in genetic algorithms" Foundations of Genetic Algorithms, 1991, 25 pages.
Haarnoja et al., "Soft actor-critic: Off-policy maximum entropy deep reinforcement learning with a stochastic actor" arXiv, 2018, 14 pages.
Houthooft et al., "Evolved policy gradients" arXiv, 2018, 18 pages.
Khadka et al., "Evolution-guided policy gradient in reinforcement learning." NIPS, 2018, 13 pages.
Kirsch et al., "Improving generalization in meta reinforcement learning using learned objectives" arXiv, 2020, 21 pages.
Kumar et al., "Conservative q-learning for offline reinforcement learning" arXiv, 2020, 31 pages.
Liu et al., "Progressive neural architecture search" arXiv, 2017, 11 pages.
Mnih et al., "Playing atari with deep reinforcement learning" arXiv, 2013, 9 pages.
Oh et al., "Discovering reinforcement learning algorithms" arXiv, 2020, 19 pages.
Pham et al., "Efficient neural architecture search via parameter sharing" arXiv, 2018, 11 pages.
Pierrot et al., "Learning compositional neural programs with recursive tree search and planning" arXiv, 2019, 19 pages.
Real et al., "Large-scale evolution of image classifiers" arXiv, 2017, 18 pages.
Real et al., "Regularized evolution for image classifier architecture search" AAAI, 2019, 10 pages.
Real et al., "Automl-zero: Evolving machine learning algorithms from scratch" arXiv, 2020, 23 pages.
Reed et al., "Neural programmer-interpreters" arXiv, 2015, 12 pages.
Schmidhuber, "Evolutionary principles in self-referential learning" Thesis for the degree of Doctor of Philosophy, Technische Universitat Munchen, May 1987, 64 pages.
Schmidhuber, "A 'Self-Referential' Weight Matrix" Springer, 1993, 5 pages.
Schulman et al., "Proximal policy optimization algorithms" arXiv, 2017, 12 pages.
So et al., "The evolved transformer" arXiv, 2019, 14 pages.
Song et al., "Reinforcement learning with chromatic networks for compact architecture search" arXiv, 2021, 17 pages.
Stanley et al., "Evolving neural networks through augmenting topologies" Evolutionary Computation, 2002, 29 pages.
Tang et al., "Online hyper-parameter tuning in off-policy learning via evolutionary strategies" arXiv, 2020, 14 pages.
Trujillo et al., "Synthesis of interest point detectors through genetic programming" ACM, 2006, 8 pages.
Van Hasselt et al., "Deep reinforcement learning with double q-plearning" AAAI, 2016, 7 pages.
Vieillard et al., "Munchausen reinforcement learning" arXiv, 2020, 29 pages.
Wang et al., "Learning to reinforcement learn" arXiv, 2017, 17 pages.
Whiteson et al., "Evolutionary function approximation for reinforcement learning" Journal of Machine Learning Research, 2006, 41 pages.
Zoph et al., "Neural architecture search with reinforcement learning" arXiv, 2016, 16 pages.
Zoph et al., "Learning transferable architectures for scalable image recognition" IEEE, 2018, 14 pages.

* cited by examiner

REINFORCEMENT LEARNING ALGORITHM SEARCH

BACKGROUND

This specification generally relates to searching for a reinforcement learning algorithm.

Reinforcement learning algorithms are procedures that map an agent's experience in interacting with an environment to a policy for controlling the agent as the agent interacts with the environment. Some reinforcement learning algorithms generate the policy using one or more neural networks.

SUMMARY

A reinforcement learning algorithm describes a system that selects actions to be performed by a corresponding agent interacting with an environment. While reinforcement learning methods have been used for automating supervised learning algorithms, automating reinforcement learning itself has been limited, especially for developing domain-independent reinforcement learning algorithms that can be applied to different types of tasks.

Reinforcement learning requires different design choices compared to supervised learning, including the formulation of reward and policy update rules. All of those design choices affect learning and performance, and are usually chosen through trial and error. Designing new deep reinforcement learning algorithms that can efficiently solve a wide variety of problems generally requires a tremendous amount of effort. Using machine learning to design reinforcement learning algorithms or sub-components of algorithms would help ease this burden and could result in better algorithms than researchers could design manually. This specification provides a system and associated methods for searching general update rules for reinforcement learning algorithms that can be applied to a diverse set of environments.

In one aspect of the specification, a method is provided for generating and searching a reinforcement learning algorithm. The method can be implemented using a computer system. The computer system generates a sequence of candidate reinforcement learning algorithms. Each candidate reinforcement learning algorithm in the sequence is configured to receive an input environment state characterizing a state of an environment and to generate an output that specifies an action to be performed by an agent interacting with the environment. For each candidate reinforcement learning algorithm in the sequence, the system performs a performance evaluation for a plurality of training environments. For each training environment, the system adjusts a set of environment-specific parameters of the candidate reinforcement learning algorithm by performing training of the candidate reinforcement learning algorithm to control a corresponding agent in the training environment. The system generates an environment-specific performance metric for the candidate reinforcement learning algorithm that measures a performance of the candidate reinforcement learning algorithm in controlling the corresponding agent in the training environment as a result of the training. After performing training in the set of training environments, the system generates a summary performance metric for the candidate reinforcement learning algorithm by combining the environment-specific performance metrics generated for the set of training environments. After evaluating each of the candidate reinforcement learning algorithms in the sequence, the system selects one or more output reinforcement learning algorithms from the sequence based on the summary performance metrics of the candidate reinforcement learning algorithms.

In general, the described system and methods provide a solution for automatically learning new reinforcement learning algorithms that can be generalized to solve a wide variety of problems. The provided system and methods can increase the efficiency of designing reinforcement learning algorithms, and can produce reinforcement learning algorithms with improved performance. The described system uses a search language that includes neural network sub-modules, and expresses general symbolic loss functions which can be applied to any environment. The system further performs training and evaluating the candidate reinforcement learning algorithms using a diverse set of environments. As a result, the learned reinforcement learning algorithms can generalize to new environments that are not encountered during training.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
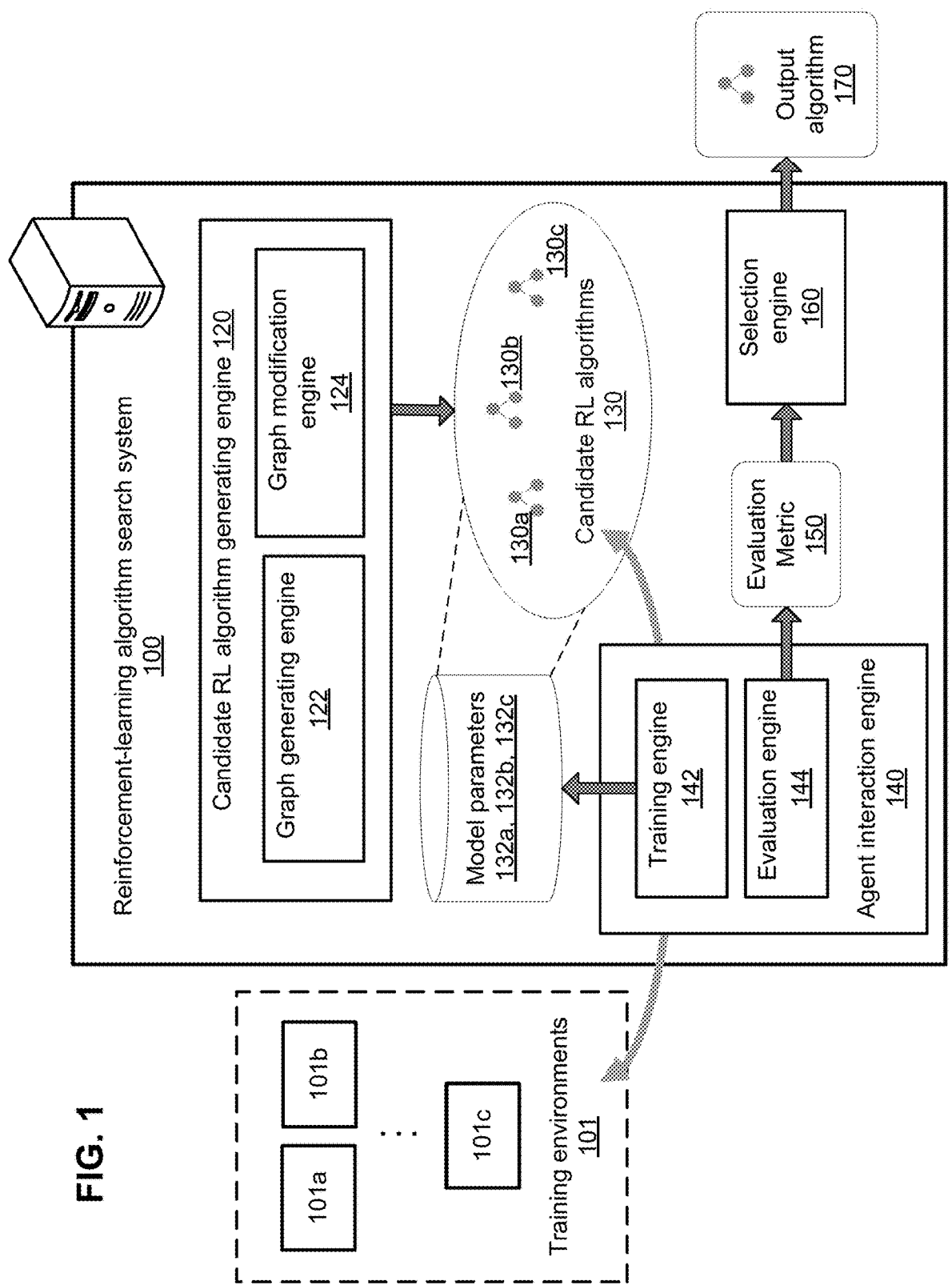
FIG. 1 shows an example of a reinforcement learning algorithm search system.

A reinforcement learning algorithm describes a system that selects actions to be performed by a corresponding agent interacting with an environment. The reinforcement learning system receives data characterizing the current state of the environment and selects an action from a set of actions to be performed by the agent in response to the received data. Once the action has been selected by the reinforcement learning system, the agent performs the action to interact with the environment. Generally, the agent interacts with the environment in order to perform a particular task, i.e., achieve a specified result, and the reinforcement learning system receives a reward value in response to the agent performing a selected action that reflects the progress of the agent toward performing the particular task. The reinforcement learning system selects actions in order to maximize the likelihood of completing the task, for example, by maximizing an expected cumulative reward or other reinforcement signal that accumulates from the immediate rewards.

In some implementations, the environment is a real-world environment and the agent is a control system for a mechanical agent interacting with the real-world environment. The agent may be a mechanical or electronic agent and the actions may comprise control inputs to control the mechanical or electronic agent. The observations may be derived from sensors, for example image sensors, and/or they may be derived from electrical or mechanical signals from the agent. For example, the agent may be a control system integrated in an autonomous or semi-autonomous vehicle navigating through the environment. In these implementations, the actions may be possible control inputs to control the vehicle and the result that the agent is attempting to achieve is to satisfy objectives for the navigation of the vehicle through the real-world environment. For example, the objectives can include one or more of: reaching a destination, ensuring the safety of any occupants of the vehicle, minimizing energy used in reaching the destination, maximizing the comfort of the occupants, and so on.

In some further implementations, the environment is a real-world environment and the agent is a computer system that generates outputs for presentation to a user. For example, the environment may be a patient diagnosis environment such that each state is a respective patient state of a patient, i.e., as reflected by health data characterizing the health of the patient, and the agent may be a computer system for suggesting treatment for the patient. In this example, the actions in the set of actions are possible medical treatments for the patient and the result to be achieved can include one or more of maintaining a current health of the patient, improving the current health of the patient, minimizing medical expenses for the patient, and so on. The observations may comprise data from one or more sensors, such as image sensors or biomarker sensors, and/or may comprise processed text, for example from a medical record.

In some other implementations, the environment is a simulated environment and the agent is implemented as one or more computer programs interacting with the simulated environment. For example, the simulated environment may be a virtual environment in which a user competes against a computerized agent to accomplish a goal and the agent is the computerized agent. In this example, the actions in the set of actions are possible actions that can be performed by the computerized agent and the result to be achieved may be, e.g., to win the competition against the user.

The reinforcement learning algorithm can include a neural network (NN) to select actions to be performed by the agent interacting with the environment. The neural network has a set of network parameters and is configured to receive an input observation characterizing a state of the environment and to process the input observation in accordance with the network parameters to generate a network output that includes an action selection output that defines an action selection policy for selecting an action to be performed by the agent in response to the input observation.

During training of a reinforcement learning neural network, the algorithm can update the network parameters of the reinforcement learning NN by minimizing a loss function, which measures the difference between a predicted action selection output and a target action selection output. For example, for a deep Q network (DQN), the algorithm can represent the loss function as an L2 distance between a target Q value calculated using a target network and a prediction Q value calculated by a prediction network.

Thus, a reinforcement learning algorithm can be described by a network architecture for the reinforcement learning neural network and a loss function that is used to train the neural network.

Designing new deep reinforcement learning algorithms that can efficiently solve a wide variety of problems generally requires a tremendous amount of manual effort. Learning to design reinforcement learning algorithms or sub-components of algorithms would help ease this burden and could result in better algorithms than researchers could design manually. This specification generally describes a system and associated methods for generating and searching reinforcement learning algorithms that can be applied to a diverse set of environments.

One feature of the described system and methods is that the learned reinforcement learning algorithms can be domain agnostic. That is, the learned reinforcement learning algorithms can generalize to new environments that are not encountered during training. To achieve this goal, the described system adopts two strategies, including: (1) using a search language that can expresses general symbolic loss functions which can be applied to any environment; and (2) training and evaluating the candidate reinforcement learning algorithms using a diverse set of environments.

In some implementations, the described system generates representations of reinforcement learning algorithms using computational graphs. The system can design computational graphs to express symbolic loss functions that can be applied to any environment. These computational graphs can support the use of neural network modules as subcomponents of the corresponding reinforcement learning algorithm, so that more complex neural network architectures can be realized. The system can also apply data typing and a generic interface to variables for the computational graphs, allowing the learned algorithms to be domain agnostic.

In some implementations, the described system and methods train and evaluate a sequence of candidate reinforcement learning algorithms on a variety of environments. In an example process, the system performs an outer loop search over the space of computational graphs representing the sequence of candidate reinforcement learning algorithms. The goal for the outer loop optimization is to select a reinforcement learning algorithm with high training return over a set of training environments. In an inner loop through the set of training environments, the system trains a candidate reinforcement learning algorithm on a given environment and calculates an environment-specific performance metric for the candidate reinforcement learning algorithm. Following the inner loop, the system calculates a summary performance metric for the candidate reinforcement learning algorithm by combining the environment-specific performance metrics generated for the set of training environments.

FIG. 1 shows an example of a reinforcement learning algorithm search system 100 for generating and searching for an output reinforcement learning algorithm. The system 100 is an example of a system implemented as computer programs on one or more computers in one or more locations, in which the systems, components, and techniques described below can be implemented.

In general, the system 100 generates a sequence of candidate reinforcement learning algorithms, performs training for each of candidate reinforcement learning algorithms in a set of training environments, calculates a summary performance for each candidate reinforcement training algorithms, and selects one or more output reinforcement learning algorithms from the candidate reinforcement learning algorithms based on the summary performance metrics. The training for a specific candidate reinforcement learning algorithm in a specific training environment includes adjusting a set of environment-specific parameters of the candidate reinforcement learning algorithm and generating an environment-specific performance metric for the candidate reinforcement learning algorithm that measures a performance of the candidate reinforcement learning algorithm in controlling a corresponding agent in the training environment as a result of the training. The system calculates the summary performance of a specific candidate reinforcement learning algorithm by combining the environment-specific performance metrics generated for the set of training environments.

In some implementations, the system 100 can use the output reinforcement algorithm to control an agent to perform a task in a specific training environment in the set of training environments. The environment-specific parameters generated by the training process performed for the specific environment can be readily used for the output reinforcement algorithm. In some other implementations, the system 100 can train the output reinforcement algorithm in a new environment to generate new environment-specific parameters, and uses the output algorithm with the new environment-specific parameters to control an agent to perform a new task in the new environment, without needing to update the neural network architecture or loss function formulation of the output reinforcement learning algorithm. In some other implementations, the system 100 can provide data specifying the output reinforcement learning algorithm to another system to control a new agent to interact with a new environment.

The system 100 includes a candidate reinforcement learning algorithm generating engine 120 for generating a sequence of candidate reinforcement learning algorithms 130, an agent interaction engine 140 for controlling a corresponding agent to interact with each of a plurality of training environments 101 according to a candidate reinforcement learning algorithm, and a selection engine 160 to select an output reinforcement learning algorithm 170 from the sequence of candidate reinforcement learning algorithms 130 according to an evaluation metric 150 that evaluates the performance of the candidate reinforcement learning algorithms. In some implementations, the selection engine also makes selections of the candidate reinforcement learning algorithms 130 based on the evaluation metric 150, i.e., to propose candidates to be used to control agents by the agent interaction engine 140.

The candidate reinforcement learning algorithm generating engine 120 includes a graph generating engine 122 and a graph modification engine 124.

The candidate reinforcement learning algorithm generating engine 120 can generate a candidate reinforcement learning algorithm from scratch by first generating graph data of a computational graph representing the candidate reinforcement learning algorithm. The candidate reinforcement learning algorithm generating engine 120 can also generate a candidate reinforcement learning algorithm based on a known reinforcement learning algorithm by generating and modifying graph data of the computational graph representing the known reinforcement learning algorithm. The graph generating engine 122 generates the graph data of the computational graphs representing the candidate reinforcement learning algorithms either from scratch or based on a known reinforcement learning algorithm. The graph modification engine 124 modifies a computational graph to mutate a parent candidate reinforcement learning algorithm to a child candidate reinforcement learning algorithm with new algorithm features.

The agent interaction engine 140 includes a training engine 142 and an evaluation engine 144.

The training engine 142 updates, for each of the candidate reinforcement learning algorithms 130a, 130b, or 130c, a respective set of model parameters 132a, 132b, or 132c.

The evaluation engine 144 generates, for each candidate reinforcement learning algorithm, the evaluation metric 150 that measures a combined performance of the candidate reinforcement learning algorithm for all the training environments in the set of training environments 101.

The training environments 101 include a plurality of different types of training environments 101a, 101b, 101c, and so on. The choice of training environments affects the learned algorithms and their generalization performance. In general, a range of different types of training environments can be used. The training environments can include real-world environments, simulated environments, or both. In a demonstrative example, the system 100 uses a set of training environments 101 including several classical control tasks and several multitask in gridworld style environments. The classical control tasks involve an agent that controls one or more objects to perform a task in a simulated or a physical environment, such as an agent balancing a pole on top of a cart by applying a force to the cart (CartPole), or an agent controlling a car to drive up a mountain by driving back and forth to build up momentum (MountainCar). The multitask in gridworld style environments involves an agent navigating a grid to accomplish one or more tasks, such as finding a key hidden in one room and then using the key to unlock a door of another room to pick up an object behind the locked door. These environments cover a diverse set of situations, including dense and sparse reward, long time horizon, and tasks requiring solving a sequence of sub-goals such as picking up a key and unlocking a door.

For each candidate reinforcement learning algorithm, the agent interaction engine 140 controls a corresponding agent to interact with each of a plurality of training environments 101 according to the candidate reinforcement learning algorithm. The agent interaction engine 140 loops through the set of training environments. For a given training environment, the training engine 142 trains the candidate reinforcement learning algorithm based on the given environment. The training engine 142 updates the model parameters of the reinforcement learning NN by minimizing the loss function that measures the difference between a predicted and an actual result predicted action selection output and a target action selection output. The evaluation engine 144 calculates an environment-specific performance metric for the candidate reinforcement learning algorithm for the given environment.

In an example process, the agent interaction engine 140 controls an agent to interact with a given training environment E according to a candidate reinforcement learning algorithm parameterized with a policy $\pi_\theta(a_t|s_t)$. At each of a plurality of time steps, the agent performs an action $a_t$ to the given environment $\varepsilon$, and receives a reward $r_t$ and a next state $s_{t+1}$. For discrete action value-based reinforcement learning algorithms, θ are model parameters for a Q-value function and the policy can be obtained from the Q-value function using an ε-greedy strategy. The agent interaction engine 140 can save the stream of transitions $(s_t, s_{t+1}, a_t, r_t)$ to a replay buffer and continually updates the parameters by minimizing a loss function $L(s_t, a_t, r_t, s_{t+1}, \theta, \gamma)$ over these transitions with gradient descent. Since the updates are based on the interactions with the given environment ε, the leaned model parameters are environment-specific.

In some implementations, the agent interaction engine 140 performs the training for a fixed number of M training episodes. In each episode m, the agent earns episode return $R_m = \Sigma_{t=0}^{T} r_t$. After performing the M training episodes, the system can calculate the environment-specific performance metric of the candidate reinforcement learning algorithm for the given environment ε using a normalized average training return, $$\frac{1}{M} \Sigma_{m=1}^{M} \frac{R_i - R_{min}}{R_{max} - R_{min}},$$

where $R_{min}$ and $R_{max}$ are the minimum and maximum return for that environment.

After looping through the set of training environments, the evaluation engine 144 calculates a summary performance metric 150 for the candidate reinforcement learning algorithm by combining the environment-specific performance metrics generated for the set of training environments. In an example, the evaluation engine 144 calculates the summary performance metric 150 as a sum or an average of the environment-specific performance metrics generated for the set of training environments 101. The summary performance metric 150 measures an overall performance of the candidate reinforcement learning algorithm for all the training environments in the set of training environments 101.

After training and evaluating each candidate reinforcement learning algorithm in the sequence of candidate reinforcement learning algorithms 130, the selection engine 160 selects one or more output reinforcement learning algorithms from the candidate reinforcement learning algorithms based on the evaluation metric 150. For example, the selection engine 160 selects an evaluated candidate reinforcement learning algorithm with the highest performance metric as the output algorithm 170. Since the evaluation metric 150 measures an overall performance of the candidate reinforcement learning algorithm for a diverse set of training environments, the output algorithm 170 has the best domain-agnostic performance, i.e., is most likely to generalize to environments that are not encountered in training.

The sequence of candidate reinforcement learning algorithms 130 is generated by the candidate reinforcement learning algorithm generating engine 120.

As a particular example, the candidate reinforcement learning algorithm generating engine 120 can first initialize the sequence of candidate reinforcement learning algorithms 130 with one or more initial algorithms. The graph generating engine 122 generates, for each candidate reinforcement learning algorithm in the sequence of candidate reinforcement learning algorithms, respective graph data for a computational graph that represents the candidate reinforcement learning algorithm.

An example of a computational graph representing a candidate reinforcement learning algorithm will be discussed in FIG. 2 and the accompanying descriptions.

In general, the computational graph for each candidate reinforcement learning algorithm includes a plurality of nodes, including, for example, input nodes, parameter nodes, operation nodes, and output nodes. The input nodes represent inputs to the reinforcement learning algorithm. The inputs represented by the input nodes can include one or more environment states and one or more hyper-parameters, such as the discount factor γ for time-delayed rewards, for the candidate reinforcement learning algorithm. The parameter nodes represent parameters of the reinforcement learning algorithm, such as neural network weight and bias parameters. The output nodes represent outputs generated by the reinforcement learning algorithm. For example, an output node can represent a scalar loss value to be optimized as the output of the algorithm.

The operation nodes represent operations in the reinforcement learning algorithm. Each operation node is associated with an operation type selected from a list of operation types. The list of operation types include an arithmetic operation, a linear algebra operation, a statistical operation, a list operation, and a neural network operation. Table 1 shows a list of example operations performed by different types of operation nodes. The arithmetic operations include arithmetic calculations applied to scalar values or element-wise calculations of vectors and matrices, such as "Add", "Subtract", "Div", "Log", and "Exp". The linear algebra operations include vector and matrix calculation, such as "DotProduct" and "L2Distance". The list operations include operations on a list input, such as "MaxList", MinList", and "SelectList". The statistical operations include operations for calculating probabilities and statistical parameters, such as "softMax", "Entropy", and "KLDiv". The neural network operations include using a neural network to process the input to generate the output. By supporting the use of neural network modules as subcomponents of the representing graph, the candidate reinforcement learning algorithm generating engine 120 can realize complex neural network architectures.

Each node in the graph is connected to one or more other nodes with respective directed edges. Each directed edge in the graph passes a node output from a source node to be received as a node input by a receiver node Each operation node in the graph receives one or more node inputs from one or more source nodes connected to the operation nodes, and generates one or more node outputs by performing an operation, according to the associated operation type, to the node inputs.

In some implementations, the graph generating engine 122 specifies a data type for each node input and each node output. The data types can include state, action, vector, float (real value), list, and probability. For example, parameter nodes representing neural network weights for a Q-value network and the corresponding neural network node can map an input node with state data type to a list of real numbers for each action.

The graph generating engine 122 further specifies, for each operation node, depending on the operation type, one or more allowed data types for the node input and one or more allowed data types for the node output. Table 1 shows examples of allowed input and output types for operation nodes with different operation types. For example, the allowed data types for the node outputs from neural network operation nodes can include real values, lists, and vectors. The allowed data types for the node inputs to neural network operation nodes can include an environment state. The data typing allows for a represented algorithm to be applied to any domain. It also restricts the space of programs to ones with valid typing which reduces the search space.

TABLE 1

Operation types of operation nodes and associated input types and output data types. The data types include state $\mathbb{S}$, action $\mathbb{Z}$, float $\mathbb{R}$, list List[ $\mathbb{X}$ ], probability $\mathbb{P}$, vector $\mathbb{V}$. The symbol $\mathbb{X}$ indicates it can be of $\mathbb{S}$, $\mathbb{R}$, or $\mathbb{V}$.

| Operation | Input Types | Output Type |
|---|---|---|
| Add | $\mathbb{X}, \mathbb{X}$ | $\mathbb{X}$ |
| Subtract | $\mathbb{X}, \mathbb{X}$ | $\mathbb{X}$ |
| Max | $\mathbb{X}, \mathbb{X}$ | $\mathbb{X}$ |
| Min | $\mathbb{X}, \mathbb{X}$ | $\mathbb{X}$ |
| DotProduct | $\mathbb{X}, \mathbb{X}$ | $\mathbb{R}$ |
| Div | $\mathbb{X}, \mathbb{X}$ | $\mathbb{X}$ |
| L2Distance | $\mathbb{X}, \mathbb{X}$ | $\mathbb{R}$ |
| MaxList | List[ $\mathbb{R}$ ] | $\mathbb{R}$ |
| MinList | List[ $\mathbb{R}$ ] | $\mathbb{R}$ |
| ArgMaxList | List[ $\mathbb{R}$ ] | $\mathbb{Z}$ |
| SelectList | List[ $\mathbb{X}$ ], $\mathbb{Z}$ | $\mathbb{X}$ |
| MeanList | List[ $\mathbb{X}$ ] | $\mathbb{X}$ |
| VarianceList | List[ $\mathbb{X}$ ] | $\mathbb{X}$ |
| Log | $\mathbb{X}$ | $\mathbb{X}$ |
| Exp | $\mathbb{X}$ | $\mathbb{X}$ |
| Abs | $\mathbb{X}$ | $\mathbb{X}$ |
| (C)NN: $\mathbb{S} \to$ List[ $\mathbb{R}$ ] | $\mathbb{S}$ | List[ $\mathbb{R}$ ] |
| (C)NN: $\mathbb{S} \to \mathbb{R}$ | $\mathbb{S}$ | $\mathbb{R}$ |
| (C)NN: $\mathbb{S} \to \mathbb{V}$ | $\mathbb{V}$ | $\mathbb{V}$ |
| Softmax | List[ $\mathbb{R}$ ] | $\mathbb{P}$ |
| KLDiv | $\mathbb{P}, \mathbb{P}$ | $\mathbb{R}$ |
| Entropy | $\mathbb{P}$ | $\mathbb{R}$ |
| Constant | | 1, 0.5, 0.2, 0.1, 0.01 |
| MultiplyTenth | $\mathbb{X}$ | $\mathbb{X}$ |
| Normal(0, 1) | | $\mathbb{R}$ |
| Uniform(0, 1) | | $\mathbb{R}$ |

In some implementations, the candidate reinforcement learning algorithm generating engine 120 initializes the candidate reinforcement learning algorithms randomly from scratch. For example, the candidate reinforcement learning algorithm generating engine 120 can randomly generate a sequence of operation nodes for a candidate reinforcement learning algorithm. For each operation node in the sequence, the candidate reinforcement learning algorithm generating engine 120 can sample the operation types and valid inputs over all possible options with a uniform probability distribution or another type of probability distribution.

In some other implementations, the candidate reinforcement learning algorithm generating engine 120 initializes the learning based on one or more known reinforcement learning algorithms by including the known reinforcement learning algorithms in the initial sequence of candidate reinforcement learning algorithms. For example, the candidate reinforcement learning algorithm generating engine 120 can initialize the candidate reinforcement learning algorithms with a DQN reinforcement learning algorithm.

After initializing the sequence of candidate reinforcement learning algorithms, the candidate reinforcement learning algorithm generating engine 120 repeatedly performs iterations of an evolutionary search technique to generate new candidate algorithms. In particular, at each iteration, the engine 120 selects a parent candidate reinforcement learning algorithm from the existing sequence, and modifies the parent candidate reinforcement learning algorithm to generate one or more child candidate reinforcement learning algorithms. The candidate reinforcement learning algorithm generating engine 120 further determines whether to add a generated child candidate reinforcement learning algorithm to the sequence of candidate reinforcement learning algorithms 130 to be trained and evaluated by the agent interaction engine 140.

In some implementations, the candidate reinforcement learning algorithm generating engine 120 uses a tournament strategy to select the parent candidate reinforcement learning algorithm at each iteration of the evolutionary search. At each iteration, the candidate reinforcement learning algorithm generating engine 120 selects a subset of the current sequence of candidate reinforcement learning algorithms at random, and selects the candidate reinforcement learning algorithm from the subset with the best performance metric as a parent candidate reinforcement learning algorithm. The graph modification engine 124 modifies the parent candidate reinforcement learning algorithm into a child candidate reinforcement learning algorithm. In some implementations, the candidate reinforcement learning algorithm generating engine 120 further removes the oldest algorithm from the sequence of candidate reinforcement learning algorithms after adding a child candidate reinforcement learning algorithm to the current sequence of candidate reinforcement learning algorithms.

In some implementations, the graph modification engine 124 modifies the parent candidate reinforcement learning algorithm by modifying the corresponding computational graph. The modification process can include several steps. First, the graph modification engine 124 selects, from the computational graph representing the parent candidate reinforcement learning algorithm, an operation node to be modified. In some implementations, the graph modification engine 124 randomly selects the operation node to be modified from all the operation nodes in the graph, for example, according to a uniform probability distribution or another specified probability distribution. Next, the graph modification engine 124 replaces the selected operation node with a replacement operation node representing a chosen type of operation. The type of operation can be randomly chosen from a list of operation types, such as one of the operation types in Table 1. Next, the graph modification engine 124 selects one or more node inputs to the replacement operation node. The node inputs can be randomly selected from a list of possible inputs. The graph modification engine 124 can perform a data type validity check when selecting the inputs. For the node type validity check, the graph modification engine 124 determines whether the data type of a node input is from the list of allowed data types according to the operation type associated with the replacement operation node. If the data type of the node input is not from the list of allowed data types, the graph modification engine 124 does not select the node input to the replacement operation node.

After generating the child candidate reinforcement learning algorithm, the candidate reinforcement learning algorithm generating engine 120 can perform a functional equivalency check. The functional equivalency check determines whether the child candidate reinforcement learning algorithm has a different behavior compared to the current sequence of candidate reinforcement learning algorithms. The candidate reinforcement learning algorithm generating engine 120 can check if the child candidate reinforcement learning algorithm is functionally equivalent to any previously evaluated algorithm by hashing a concatenated output of the algorithm for a specific number of values of randomized inputs. If the candidate reinforcement learning algorithm generating engine 120 determines that the child candidate reinforcement learning algorithm has a different behavior compared to the current sequence of candidate reinforcement learning algorithms, the system 100 can proceed with further evaluation, and/or add the child candidate reinforcement learning algorithm into the current sequence of candidate reinforcement learning algorithms. If the candidate reinforcement learning algorithm generating engine 120 determines that the child candidate reinforcement learning algorithm does not have a different behavior compared to previously evaluated candidate reinforcement learning algorithm in the current sequence of candidate reinforcement learning algorithms, the system 100 can skip further performance evaluation of the child candidate reinforcement learning algorithm. In some implementations, the system 100 does not automatically discard a child candidate reinforcement learning algorithm that is functionally equivalent to a previously evaluated candidate algorithm in the sequence. Instead, the system assigns the performance metric of the previously evaluated candidate reinforcement learning algorithm to the child candidate reinforcement learning algorithm, and still adds the child candidate reinforcement learning algorithm to the sequence of candidate reinforcement learning algorithms. Since some nodes of the graph do not always contribute to the output, parts of the mutated algorithm may eventually contribute to a functionally different program.

In some implementations, the system 100 further performs an early-hurdle check for a child candidate reinforcement learning algorithm. In order to increase learning efficiency, the system can terminate the evaluation process early for candidate reinforcement learning algorithms that perform poorly. The agent interaction engine 140 can perform training of the child candidate reinforcement learning algorithm based on a test training environment, and generate a test performance metric for the child candidate reinforcement learning algorithm with respect to the test training environment. The system 100 then determines whether the test performance metric of the child candidate reinforcement learning algorithm exceeds a threshold. If the test performance metric of the child candidate reinforcement learning algorithm exceeds the threshold, the system proceeds to add the child candidate reinforcement learning algorithm into the current sequence of candidate reinforcement learning algorithms. If the test performance metric of the child candidate reinforcement learning algorithm does not exceed the threshold, the system skips the performance evaluation of the child candidate reinforcement learning algorithm, and skips adding the child candidate reinforcement learning algorithm into the current sequence of candidate reinforcement learning algorithms. In some implementations, the system 100 can use one of the set of training algorithms as the test training environment. Alternatively, the system 100 can use a new training environment as the test training environment. In general, the system 100 can choose a test training environment by balancing a computational burden during training (e.g., average length of a training episode) and a relevancy of the environment to the set of training environments. If the child candidate algorithm performs poorly, e. g, with a normalized training performance less than 0.6, the system can terminate episodes in a short number of steps.

In some implementations, the system 100 further performs a program check for a child candidate reinforcement learning algorithm to rule out and skip training invalid algorithms. For example, for an algorithm to be valid, the loss value generated by the function needs to be a scalar value. The system can discard any child candidate reinforcement learning algorithm outputting an invalid data type for the loss function. Additionally, the system can check if an algorithm is differentiable with respect to the policy parameters by checking if a path exists in the corresponding graph between the output and the policy parameter node. The system can discard a child candidate reinforcement learning algorithm if the algorithm is determined to be not differentiable.

Figure 2:
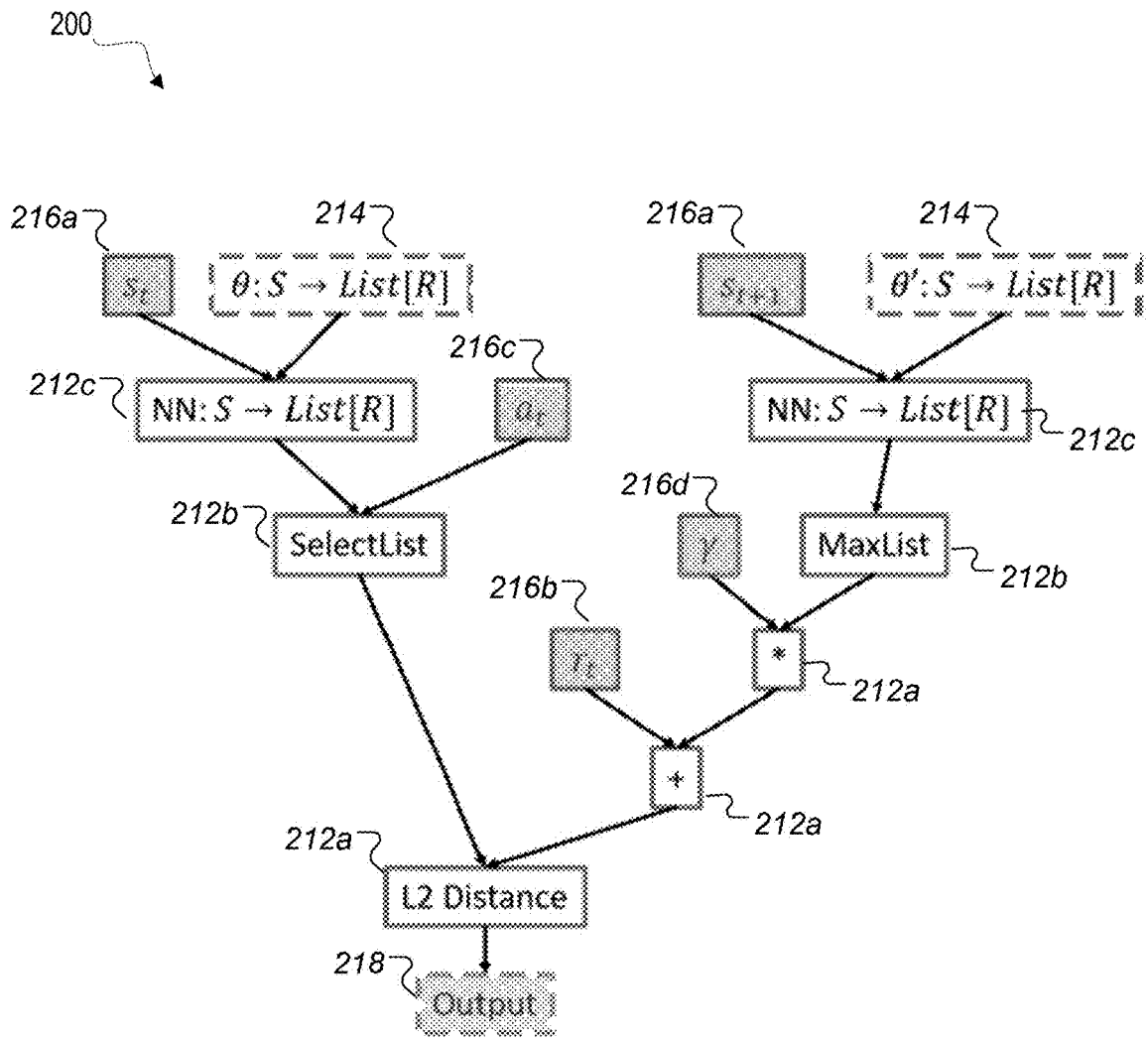
FIG. 2 shows an example of a graph representation of a reinforcement learning algorithm.
Figure 2:
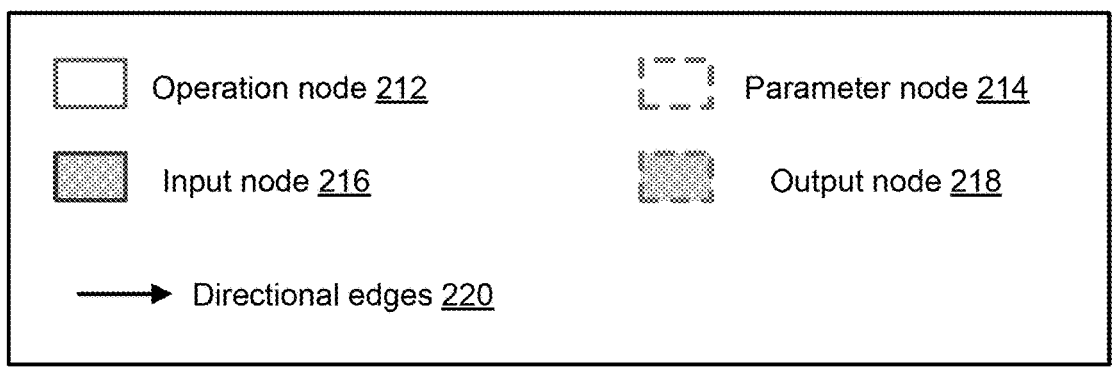

FIG. 2 shows an example of a computational graph 200 representing a DQN reinforcement learning algorithm. As shown in FIG. 2, the graph 200 includes a plurality of operation nodes 212, a plurality of parameter nodes, a plurality of input nodes 216, and an output node 218. The input nodes 216 include representations of environment states 216a, rewards 216b, agent actions 216c, and hyperparameters 216d. The operation nodes 212 include representations of arithmetic operations 212a, list operations 212b, and neural networks 212c. The parameter nodes 214 include representations of neural network parameters. The output node 218 is a representation of the loss function of the DQN algorithm. The graph 200 includes a plurality of directed edges 220 that connect the plurality of nodes into a network architecture that includes the target branch and the prediction branch of the DQN algorithm.

Figure 3A:
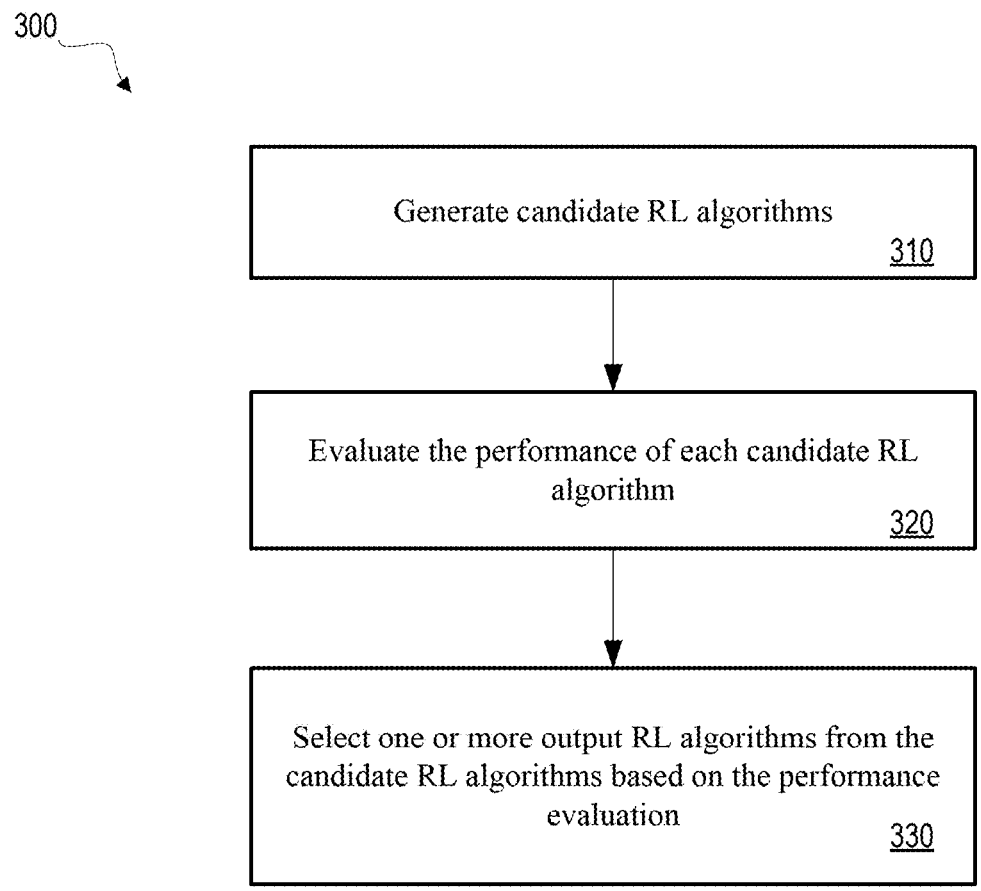
FIG. 3A is a flow diagram showing an example process for searching for an output reinforcement learning algorithm.

FIG. 3A is a flow diagram illustrating an example process 300 for searching for an output reinforcement learning algorithm. For convenience, the process 300 will be described as being performed by a system of one or more computers located in one or more locations. For example, a reinforcement learning algorithm search system, e.g., the reinforcement learning algorithm search system 100 of FIG. 1, appropriately programmed in accordance with this specification, can perform the process 300.

In step 310, the computer system generates a sequence of candidate reinforcement learning algorithms. Each candidate reinforcement learning algorithm in the sequence is configured to process a state of an environment to generate an output that specifies an action to be performed by an agent interacting with the environment. The method 300 enables both learning from scratch and learning from existing knowledge of reinforcement learning algorithms by bootstrapping the initial algorithm population with existing algorithms. Details of step 310 will be described in FIG. 3B and the accompanying descriptions.

In step 320, the computer system evaluates the performance of each candidate reinforcement learning algorithm. Since the goal of the searching method is to learn reinforcement learning algorithms that are domain agnostic and can generalize to new environments, the computer system evaluates each candidate reinforcement learning algorithm on a set of training environments. Details of step 320 will be described in FIG. 3C and the accompanying descriptions.

After evaluating each candidate reinforcement learning algorithm in the sequence of reinforcement learning algorithms, in step 330, the computer system selects one or more output reinforcement learning algorithms from the candidate reinforcement learning algorithms based on the performance evaluation. The computer system can output the evaluated candidate reinforcement learning algorithms with the highest performance scores over the set of training environments.

Figure 3B:
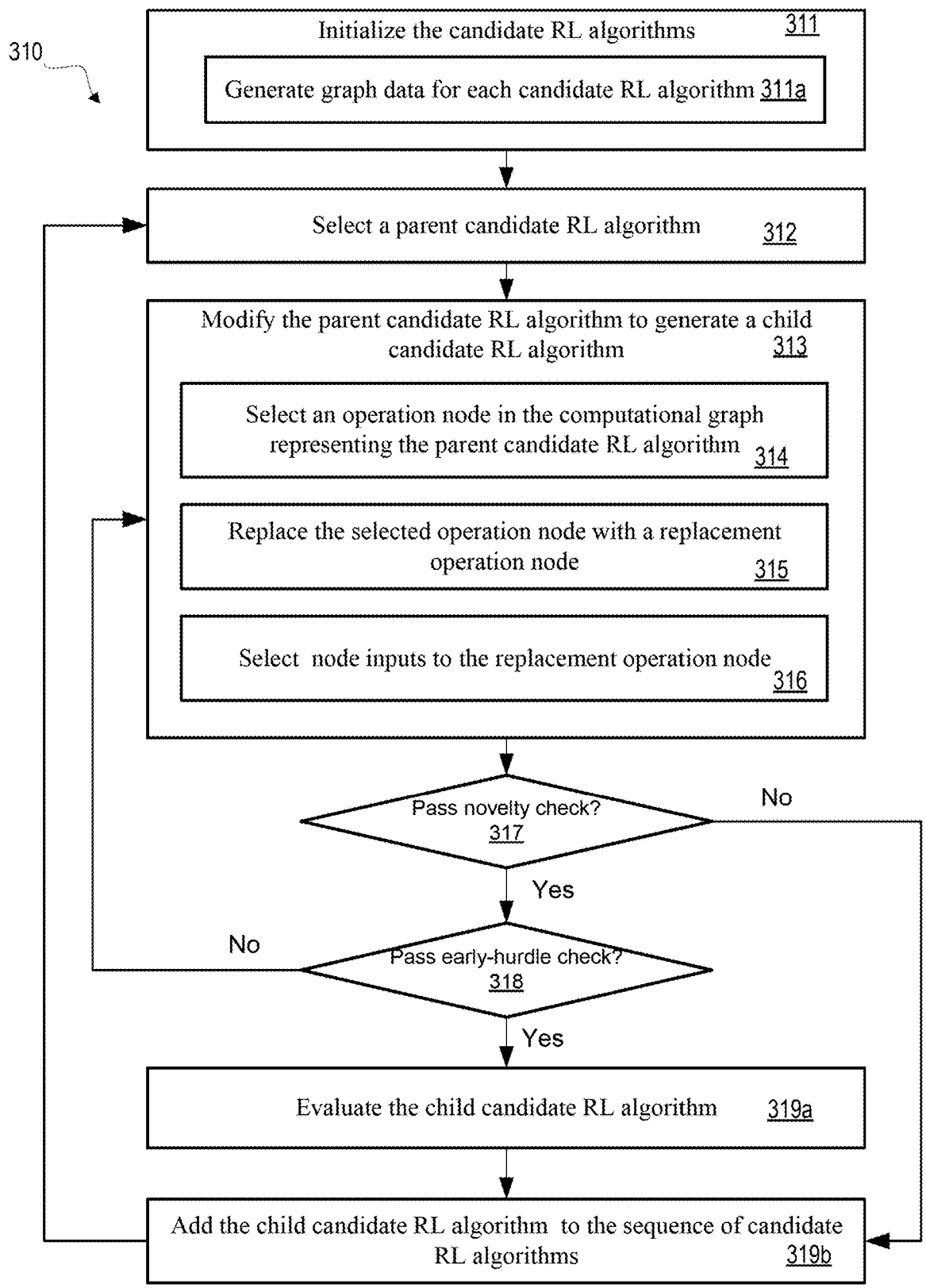
FIG. 3B is a flow diagram showing an example process for generating a sequence of candidate reinforcement learning algorithms.

FIG. 3B is a flow diagram illustrating an example process 310 for generating the candidate reinforcement learning algorithms. For convenience, the process 310 will be described as being performed by a system of one or more computers located in one or more locations. For example, a reinforcement learning algorithm search system, e.g., the reinforcement learning algorithm search system 100 of FIG.

1, appropriately programmed in accordance with this specification, can perform the process 300.

In step 311, the system initializes the sequence of candidate reinforcement learning algorithms with one or more initial algorithms. In some implementations, the system uses computational graphs to represent candidate reinforcement learning algorithms. For example, in step 311a, the system generates, for each candidate reinforcement learning algorithm, respective graph data for a computational graph that represents the candidate reinforcement learning algorithm. Each computational graph includes a plurality of nodes, including, for example, input nodes, parameter nodes, operation nodes, and output nodes. Each node in the graph is connected to one or more other nodes with directed edges. Each directed edge in the graph passes a node output from a source node to be received as a node input by a receiver node. Each operation node is associated with an operation type, including, for example, an arithmetic operation, a linear algebra operation, a probability calculation, or a statistical calculation. Each operation node in the graph receives one or more node inputs from one or more source nodes connected to the operation nodes, and generates one or more node outputs by performing an operation, according to the associated operation type, to the node inputs. FIG. 2 shows an example of a computational graph representing a DQN reinforcement learning algorithm. Table 1 shows a list of operations performed by different types of operation nodes.

In some implementations, the computer system can specify a data type for each node input and each node output, and further specify, for each operation node, depending on the operation type, one or more allowed data types for the node input and one or more allowed data types for the node output. Table 1 shows examples of allowed input and output types for operation nodes with different operation types. For example, the allowed data types for the node outputs from neural network operation nodes can include real numbers, lists, and vectors. The allowed data types for the node inputs to neural network operation nodes can include an environment state.

In some implementations, the computer system can initialize the candidate reinforcement learning algorithms randomly from scratch. For example, the system can randomly generate a sequence of operation nodes for a candidate reinforcement learning algorithm. For each operation node in the sequence, the system can sample the operation types and valid inputs over all possible options with a uniform probability distribution or another type of probability distribution. In some other implementations, the computer system can initialize the learning based on one or more known reinforcement learning algorithms by including the known reinforcement learning algorithms in the initial sequence of candidate reinforcement learning algorithms.

In one example, the system initializes the learning using the DQN algorithm with the loss function $$L_{DQN} = \left(Q(s_t, a_t) - \left(r_t + \gamma * \max_a Q_{targ}(s_t, a)\right)\right)^2, \quad (1)$$

and performs the training using three training environments (LunarLander, MiniGrid-Dynamic-Obstacles-5×5, and MiniGrid-LavaGapS5). The reinforcement learning algorithm generated by the training is termed as the DQNClipped algorithm with the loss function having the form of $$L_{DQNClipped} = \quad (2)$$
$$\max\left[Q(s_t, a_t), \delta^2 + Y_t\right] + \max\left[Q(s_t, a_t) - Y_t, \gamma\left(\max_a Q_{targ}(s_t, a)\right)^2\right]$$

where $Y_t = r_t + \gamma * \max_a Q_{targ}(s_t, a)$, and $\delta = Q(s_t, a_t) - Y_t$.

In the loss function (2) of the DQNClipped algorithm, if the Q-values become too large (when $Q(s_t, a_t) > \delta^2 + Y_t$), the loss will act to minimize $Q(s_t, a_t)$ instead of the normal $\delta^2$ loss. Alternatively, this condition can be viewed as $\delta = Q(s_t, a_t) - Y_t > \delta^2$. This means that when $\delta$ is small enough then $Q(s_t, a_t)$ are relatively close and the loss is just to minimize $Q(s_t, a_t)$. It has been demonstrated that the DQNClipped algorithm outperforms the DQN and the double DQN (DDQN) algorithm on both the training and unseen environments.

In another example, the system initializes the learning using the DQN algorithm and performs the training using three different training environments (KeyCorridorS 3R1, Dynamic-Obstacles-6×6, DoorKey-5×5). The reinforcement learning algorithm generated by the training is termed as the DQNReg algorithm with the loss function having the form of $$L_{DQNReg} = \delta^2 + 0.1 * Q(s_t, a_t) \quad (3).$$

In comparison to DQNClipped, DQNReg directly regularizes the Q values with a weighted term that is always active. Both of these loss functions modify the original DQN loss function to regularize the Q values to be lower in value. While the DQNReg algorithm takes a simple form of loss function (3), it matches or outperforms the DQN algorithm and the DDQN algorithm on all training and test environments including from classical control and Minigrid. It does particularly well on a few test environments (SimpleCrossingS9N1, DoorKey-6×6, and Unlock) and solves the tasks when other methods fail to attain any reward.

In step 312, the computer system selects a parent candidate reinforcement learning algorithm from a current sequence of candidate reinforcement learning algorithm. In one example, the computer system uses a tournament strategy to select the parent candidate reinforcement learning algorithm. In each of a plurality of cycles, the system selects a subset of the candidate reinforcement learning algorithms at random, and selects the candidate reinforcement learning algorithm from the subset with the best performance metric as a parent candidate reinforcement learning algorithm. As shown in the following steps, the computer system mutates the parent candidate reinforcement learning algorithm into a child candidate reinforcement learning algorithm, and adds the child candidate reinforcement learning algorithm to the sequence of candidate reinforcement learning algorithms. In some implementations, the computer system further removes the oldest algorithm from the sequence of candidate reinforcement learning algorithms after generating the child candidate reinforcement learning algorithm.

In step 313, the computer system modifies the parent candidate reinforcement learning algorithm to generate a child candidate reinforcement learning algorithm. In some implementations, the computer system modifies the parent candidate reinforcement learning algorithm by modifying the corresponding computational graph. This modification process can include steps 314-316 in FIG. 3B.

In step 314, the computer system can select, from the computational graph representing the parent candidate reinforcement learning algorithm, an operation node to be modified. In some implementations, the system randomly selects the operation node to be modified from all the operation nodes in the graph, for example, according to a uniform probability distribution or another specified probability distribution.

In step 315, the computer system replaces the selected operation node with a replacement operation node representing a chosen type of operation. The type of operation can be randomly chosen from a list of operation types, such as one of the operation type in Table 1.

In step 316, the computer system selects one or more node inputs to the replacement operation node. The node inputs can be randomly selected from a list of possible inputs. The computer system can perform a data type validity check when selecting the inputs. For the node type validity check, the computer system determines whether the data type of a node input is from the list of allowed data types according to the operation type associated with the replacement operation node, and if the data type of the node input is not from the list, the computer system does not select the node input to the replacement operation node.

After generating the child candidate reinforcement learning algorithm, the computer system can perform a functional equivalency check, as shown in step 317. The functional equivalency check determines whether the child candidate reinforcement learning algorithm has a different behavior compared to the current sequence of candidate reinforcement learning algorithms. The computer system can check if the child candidate reinforcement learning algorithm is functionally equivalent to any previously evaluated algorithm by hashing a concatenated output of the algorithm for a specific number of values of randomized inputs.

If the computer system determines that the child candidate reinforcement learning algorithm has a different behavior compared to the current sequence of candidate reinforcement learning algorithms, the computer system can proceed with further evaluation, and/or add the child candidate reinforcement learning algorithm into the current sequence of candidate reinforcement learning algorithms. If the computer system determines that the child candidate reinforcement learning algorithm does not have a different behavior compared to previously evaluated candidate reinforcement learning algorithms in the current sequence of candidate reinforcement learning algorithms, the computer system can skip further performance evaluation of the child candidate reinforcement learning algorithm. In some implementations, the computer system does not automatically discard a child candidate reinforcement learning algorithm that is functionally equivalent to a previously evaluated candidate algorithm in the sequence. Instead, the system assigns the performance metric of the previously evaluated candidate reinforcement learning algorithm to the child candidate reinforcement learning algorithm, and still adds the child candidate reinforcement learning algorithm to the sequence of candidate reinforcement learning algorithms. Since some nodes of the graph do not always contribute to the output, parts of the mutated algorithm may eventually contribute to a functionally different program.

The computer system can further perform an early-hurdle check, as shown in step 318. In order to increase learning efficiency, the system can terminate the evaluation process early for candidate reinforcement learning algorithms that perform poorly. The computer system can perform training of the child candidate reinforcement learning algorithm based on a test training environment, and generate test performance metric for the child candidate reinforcement learning algorithm with respect to the test training environment. The computer system then determines whether the test performance metric of the child candidate reinforcement learning algorithm exceeds a threshold. If the test performance metric of the child candidate reinforcement learning algorithm exceeds the threshold, the computer system proceeds to step 319 to add the child candidate reinforcement learning algorithm into the current sequence of candidate reinforcement learning algorithms. If the test performance metric of the child candidate reinforcement learning algorithm does not exceed the threshold, the computer system skips the performance evaluation of the child candidate reinforcement learning algorithm, and skips adding the child candidate reinforcement learning algorithm into the current sequence of candidate reinforcement learning algorithms. In one example, the system uses the CartPole environment as an early hurdle environment by training a child candidate reinforcement learning algorithm for a fixed number of episodes. If the algorithm performs poorly, then the system will terminate episodes in a short number of steps, as the pole falls rapidly.

The computer system can repeat steps 312-319 for a number of cycles for different selected parent candidate reinforcement learning algorithms. For example, at the beginning of each cycle, the system selects a subset of the candidate reinforcement learning algorithms at random, and selects the candidate reinforcement learning algorithm from the subset with the best performance metric as a parent candidate reinforcement learning algorithm. In some implementations, the computer system further removes the oldest algorithm from the sequence of candidate reinforcement learning algorithms after generating the child candidate reinforcement learning algorithm.

In some implementations, the system further performs a program check for a child candidate reinforcement learning algorithm to rule out and skip training invalid algorithms. For example, for an algorithm to be valid, the loss function needs to be a scalar value. The system can discard any child candidate reinforcement learning algorithm outputting an invalid data type for the loss function. Additionally, the system can check if an algorithm is differentiable with respect to the policy parameters by checking if a path exists in the corresponding graph between the output and the policy parameter node.

Figure 3C:
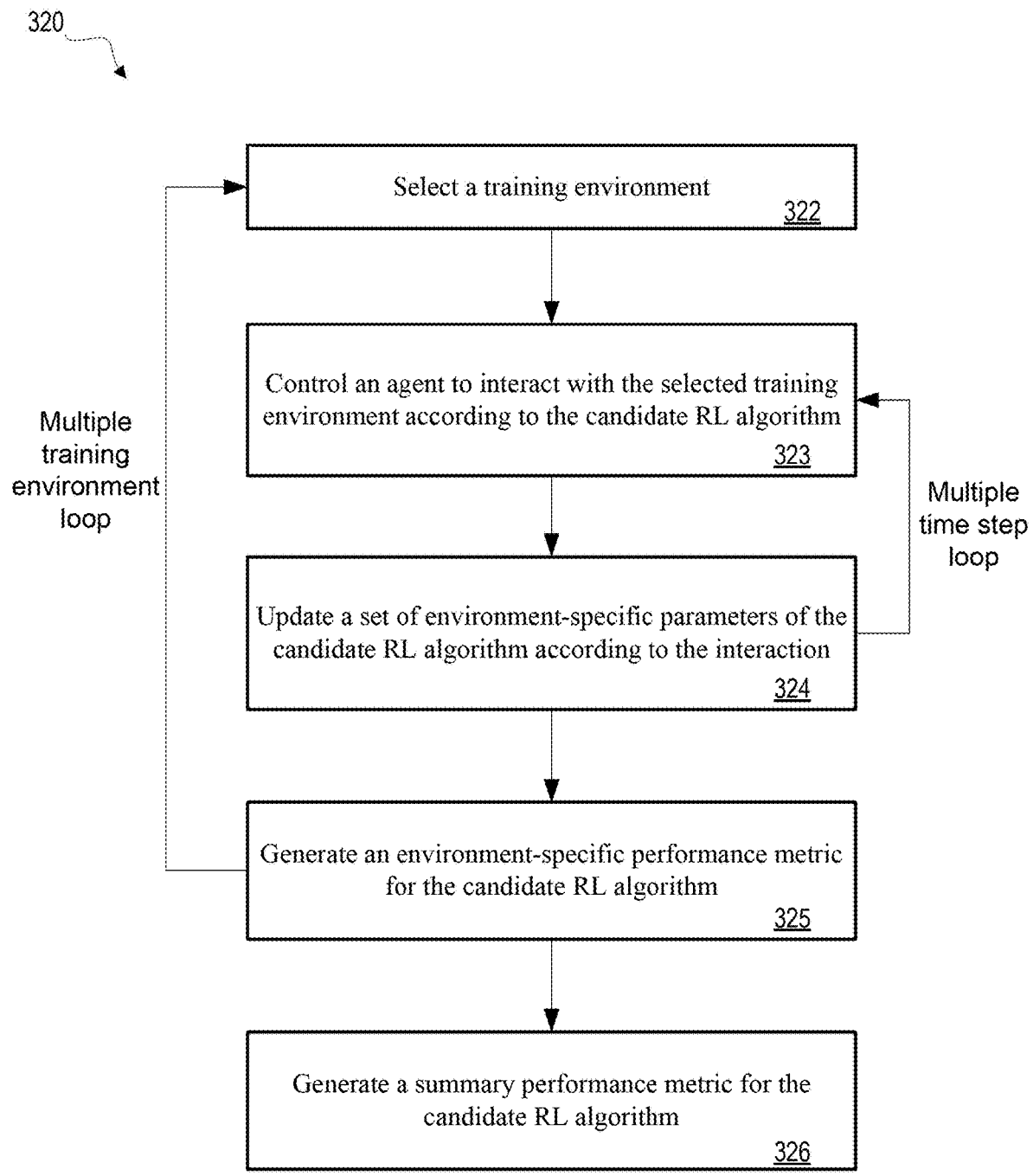
FIG. 3C is a flow diagram showing an example process for evaluating the performance of a candidate reinforcement learning algorithm.

FIG. 3C a flow diagram illustrating an example process 320 for evaluating the performance of each candidate reinforcement learning algorithm. For convenience, the process 320 will be described as being performed by a system of one or more computers located in one or more locations. For example, a reinforcement learning algorithm search system, e.g., the reinforcement learning algorithm search system 100 of FIG. 1, appropriately programmed in accordance with this specification, can perform the process 300.

For each candidate reinforcement learning algorithm, the system loops through the set of training environments. For a given training environment, the system trains the candidate reinforcement learning algorithm on the given environment and calculates an environment-specific performance metric for the candidate reinforcement learning algorithm. After looping through the set of training environments, the system calculates a summary performance metric for the candidate reinforcement learning algorithm by combining the environment-specific performance metrics generated for the set of training environments.

As shown in FIG. 3C, in step 322, the computer system selects a training environment from the set of training environments. In step 323, the computer system controls an agent to interact with the training environment according to the candidate reinforcement learning algorithm. In step 324, the computer system updates a set of environment-specific model parameters of the candidate reinforcement learning algorithm according to the interaction of the agent with the selected training environment. Step 323 and step 324 can be repeated for multiple time steps. In step 325, the computer system generates an environment-specific performance metric for the candidate reinforcement learning algorithm. The computer system repeats steps 322-325 for the plurality of training environments. In step 326, the computer system generates a summary performance metric for the candidate reinforcement learning algorithm by combining the environment-specific performance metrics for the set of training environments.

In an example process including steps 323-325, the system controls an agent to interact with the given training environment $\varepsilon$ according to a candidate reinforcement learning algorithm parameterized with a policy $\pi_\theta(a_t|s_t)$. At each of a plurality of time steps, the agent performs an action $a_t$ to the given environment $\varepsilon$, and receives a reward $r_t$ and a next state $s_{t+1}$. For discrete action value-based reinforcement learning algorithms, $\theta$ are parameters for a Q-value function and the policy can be obtained from the Q-value function using an $\epsilon$-greedy strategy. The system can save the stream of transitions $(s_t, s_{t+1}, a_t, r_t)$ to a replay buffer and continually updates the environment-specific parameters by minimizing a loss function $L(s_t, a_t, r_t, s_{t+1}, \theta, \gamma)$ over these transitions with gradient descent.

In some implementations, the system perform the training for a fixed number of M training episodes. In each episode m, the agent earns episode return $R_m = \Sigma_{t=0}^T r_t$. After performing the M training episodes, the system can summarize the environment-specific performance metric of the candidate reinforcement learning algorithm for the given environment using a normalized average training return, $$\frac{1}{M}\Sigma_{m=1}^M \frac{R_i - R_{min}}{R_{max} - R_{min}},$$

where $R_{min}$ and $R_{max}$ are the minimum and maximum return for that environment.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claim is:

1. A computer-implemented method, comprising:
   generating a sequence of candidate reinforcement learning algorithms that each have a respective corresponding candidate reinforcement learning neural network, each candidate reinforcement learning algorithm in the sequence being configured to receive an input environment state characterizing a state of an environment and to generate an output that specifies an action to be performed by an agent interacting with the environment, and for each candidate reinforcement learning algorithm, generating respective graph data that represents a computational graph that represents the candidate reinforcement learning algorithm, wherein the computational graph representing the respective candidate reinforcement learning algorithm includes:

a plurality of nodes, each node being associated with a node type selected from a set of node types, the set of node types including:

an input node representing an input to the candidate reinforcement learning algorithm;

a set of parameter nodes each representing a parameter of the candidate reinforcement learning algorithm;

a set of operation nodes each representing an operation in the candidate reinforcement learning algorithm, each operation node being associated with an operation type selected from a list of operation types; and an output node representing an output generated by the candidate reinforcement learning algorithm; and a plurality of directed edges, each directed edge connecting a source node in the plurality of nodes to a receiver node in the plurality of nodes, and passing a node output from the source node to be received as a node input by the receiver node;

wherein: each of the one or more operation nodes receives one or more node inputs from one or more source nodes connected to the operation nodes, and generates one or more node outputs by performing an operation to the node inputs;

wherein one or more of the operation nodes (i) are associated with a neural network operation type and (ii) represent operations of processing node inputs with neural network blocks of the corresponding candidate reinforcement learning neural network; and wherein the output represented by the output node defines a symbolic form of a loss function for optimizing parameter values of the parameters of the candidate reinforcement learning algorithm;

wherein generating the sequence of candidate reinforcement learning algorithms comprises:

initializing the sequence of candidate reinforcement learning algorithms with one or more initial algorithms;

selecting a parent candidate reinforcement learning algorithm from a current sequence of candidate reinforcement learning algorithms;

modifying the computational graph representing the parent candidate reinforcement learning algorithm to generate one or more child computational graphs; and generating one or more child candidate reinforcement learning algorithms respectively from the one or more child computational graphs;

for each candidate reinforcement learning algorithm in the sequence, performing a performance evaluation of the candidate reinforcement learning algorithm, including:

for each training environment in a plurality of different training environments, adjusting a set of environment-specific parameters of the candidate reinforcement learning algorithm by performing training of the corresponding candidate reinforcement learning neural network to control a corresponding agent in the training environment, and generating an environment-specific performance metric for the candidate reinforcement learning algorithm that measures a performance of the candidate reinforcement learning algorithm in controlling the corresponding agent in the training environment as a result of the training;

selecting one or more output reinforcement learning algorithms from the sequence of candidate reinforcement learning algorithms based on the environment-specific performance metrics of the candidate reinforcement learning algorithms for the plurality of different training environments; and providing data specifying the selected output reinforcement learning algorithms for controlling actions of a new agent to perform a new task.

2. The method of claim 1, wherein for each of one or more of computational graphs representing one or more respective candidate reinforcement learning algorithms in the sequence:

the inputs represented by the input nodes include one or more of: an environment state, a hyper-parameter for the candidate reinforcement learning algorithm, or an action performed by the corresponding agent.

3. The method of claim 1, wherein the parameters represented by the parameter nodes include neural network weight coefficients of the neural network blocks represented by one or more of the operation nodes associated with the neural network operation type.

4. The method of claim 1, wherein the list of operation types further includes one or more of:

an arithmetic operation;

a linear algebra operation;

a list operation; or a statistic operation.

5. The method of claim 1, wherein:

each node input and each node output is associated with a data type; and each operation node, depending on the operation type of the operation node, is associated with one or more allowed data types for the node input and one or more allowed data types for the node output.

6. The method of claim 5, wherein modifying the computational graph representing the parent candidate reinforcement learning algorithm includes:

selecting an operation node in the computational graph;

replacing the selected operation node with a replacement operation node representing a chosen type of operation, the chosen type of operation being randomly chosen from a list of operation types; and randomly selecting one or more node inputs to the replacement operation node from a list of possible inputs.

7. The method of claim 6, wherein:

randomly selecting one or more node inputs to the replacement operation node from a list of possible inputs include performing a validity check before selecting a node input to the replacement operation node, the validity check including:

determining whether the data type of the node input is from the list of allowed data types according to the operation type associated with the replacement operation node; and in response to determining that the data type of the node input is not from the list of allowed data types for the replacement operation node, skipping selecting the node input to the replacement operation node.

8. The method of claim 1, wherein performing the performance evaluation of the candidate reinforcement learning algorithm further comprises:

generating a summary performance metric for the candidate reinforcement learning algorithm by combining the environment-specific performance metrics generated for the set of different training environments; and selecting the parent candidate reinforcement learning algorithm from the current sequence of candidate reinforcement learning algorithms comprises:

randomly choosing a set of candidate reinforcement learning algorithms from the current sequence of candidate reinforcement learning algorithms; and selecting a candidate reinforcement learning algorithm with the highest summary performance metric among the set of candidate reinforcement learning algorithms as the parent candidate reinforcement learning algorithm.

9. The method of claim 1, further comprising:
performing the performance evaluation for a child candidate reinforcement learning algorithm in the one or more child candidate reinforcement learning algorithms; and adding the child candidate reinforcement learning algorithm into the current sequence of candidate reinforcement learning algorithms.

10. The method of claim 9, wherein performing the performance evaluation of the candidate reinforcement learning algorithm further comprises:

generating a summary performance metric for the candidate reinforcement learning algorithm by combining the environment-specific performance metrics generated for the set of different training environments, and the method further comprises:

performing a functional equivalency check that determines whether the child candidate reinforcement learning algorithm has a different behavior compared to each of the current sequence of candidate reinforcement learning algorithms; and in response to determining that the child candidate reinforcement learning algorithm has a different behavior compared to each of the current sequence of candidate reinforcement learning algorithms, proceeding to perform the performance evaluation for the child candidate reinforcement learning algorithm and add the child candidate reinforcement learning algorithm into the current sequence of candidate reinforcement learning algorithms; and in response to determining that the child candidate reinforcement learning algorithm does not have a different behavior compared to an existing candidate reinforcement learning algorithm in the current sequence of candidate reinforcement learning algorithms, skipping the performance evaluation of the child candidate reinforcement learning algorithm, assigning the summary performance metric of the existing candidate reinforcement learning algorithm to the child candidate reinforcement learning algorithm, and proceeding to add the child candidate reinforcement learning algorithm into the current sequence of candidate reinforcement learning algorithms.

11. The method of claim 9, further comprising:
performing an early hurdle check of the child candidate reinforcement learning algorithm, including:
performing training of the child candidate reinforcement learning algorithm based on a test training environment, and generating test performance metric for the child candidate reinforcement learning algorithm with respect to the test training environment; and determine whether the test performance metric of the child candidate reinforcement learning algorithm exceeds a threshold;

in response to determining that the test performance metric of the child candidate reinforcement learning algorithm exceeds the threshold, proceeding to perform the performance evaluation for the child candidate reinforcement learning algorithm and add the child candidate reinforcement learning algorithm into the current sequence of candidate reinforcement learning algorithms; and in response to determining that the test performance metric of the child candidate reinforcement learning algorithm does not exceed the threshold, skipping the performance evaluation of the child candidate reinforcement learning algorithm, and skipping adding the child candidate reinforcement learning algorithm into the current sequence of candidate reinforcement learning algorithms.

12. The method of claim 1, further comprising:
removing the oldest candidate reinforcement learning algorithm from the current sequence of candidate reinforcement learning algorithms.

13. The method of claim 1, wherein:
the one or more initial algorithms include a deep-Q learning algorithm.

14. The method of claim 1, wherein:
the one or more initial algorithms include a randomly generated algorithm.

15. The method of claim 1, wherein modifying the computational graph representing the parent candidate reinforcement learning algorithm includes:
modifying the symbolic form of the loss function represented by the output node.

16. The method of claim 1, further comprising, for each of the one or more child computational graphs:
determining whether the symbolic form of the loss function represented by the output node of the child computational graph produces a scalar value; and
in response to determining that the symbolic form of the loss function represented by the output node of the child computational graph produces a data type other than a scalar value, skipping generating the respective candidate reinforcement learning algorithm from the child computational graph.

17. The method of claim 1, wherein performing the performance evaluation of the candidate reinforcement learning algorithm further comprises:
generating a summary performance metric for the candidate reinforcement learning algorithm by combining the environment-specific performance metrics generated for the set of different training environments; and
selecting the one or more output reinforcement learning algorithms from the sequence of candidate reinforcement learning algorithms comprises selecting the output reinforcement learning algorithms based on the summary performance metrics of the candidate reinforcement learning algorithms.

18. A system comprising one or more computers and one or more storage devices storing instructions that when executed by the one or more computers cause the one or more computers to perform:
generating a sequence of candidate reinforcement learning algorithms that each have a respective corresponding candidate reinforcement learning neural network, each candidate reinforcement learning algorithm in the sequence being configured to receive an input environment state characterizing a state of an environment and to generate an output that specifies an action to be performed by an agent interacting with the environment, and for each candidate reinforcement learning algorithm, generating respective graph data that represents a computational graph that represents the candidate reinforcement learning algorithm, wherein the computational graph representing the respective candidate reinforcement learning algorithm includes:

a plurality of nodes, each node being associated with a node type selected from a set of node types, the set of node types including:

an input node representing an input to the candidate reinforcement learning algorithm;

a set of parameter nodes each representing a parameter of the candidate reinforcement learning algorithm;

a set of operation nodes each representing an operation in the candidate reinforcement learning algorithm, each operation node being associated with an operation type selected from a list of operation types; and an output node representing an output generated by the candidate reinforcement learning algorithm; and a plurality of directed edges, each directed edge connecting a source node in the plurality of nodes to a receiver node in the plurality of nodes, and passing a node output from the source node to be received as a node input by the receiver node;

wherein: each of the one or more operation nodes receives one or more node inputs from one or more source nodes connected to the operation nodes, and generates one or more node outputs by performing an operation to the node inputs;

wherein one or more of the operation nodes (i) are associated with a neural network operation type and (ii) represent operations of processing node inputs with neural network blocks of the corresponding candidate reinforcement learning neural network; and wherein the output represented by the output node defines a symbolic form of a loss function for optimizing parameter values of the parameters of the candidate reinforcement learning algorithm;

wherein generating the sequence of candidate reinforcement learning algorithms comprises:

initializing the sequence of candidate reinforcement learning algorithms with one or more initial algorithms;

selecting a parent candidate reinforcement learning algorithm from a current sequence of candidate reinforcement learning algorithms;

modifying the computational graph representing the parent candidate reinforcement learning algorithm to generate one or more child computational graphs; and generating one or more child candidate reinforcement learning algorithms respectively from the one or more child computational graphs;

for each candidate reinforcement learning algorithm in the sequence, performing a performance evaluation of the candidate reinforcement learning algorithm, including:

for each training environment in a plurality of different training environments, adjusting a set of environment-specific parameters of the candidate reinforcement learning algorithm by performing training of the corresponding candidate reinforcement learning neural network to control a corresponding agent in the training environment, and generating an environment-specific performance metric for the candidate reinforcement learning algorithm that measures a performance of the candidate reinforcement learning algorithm in controlling the corresponding agent in the training environment as a result of the training;

selecting one or more output reinforcement learning algorithms from the sequence of candidate reinforcement learning algorithms based on the environment-specific performance metrics of the candidate reinforcement learning algorithms for the plurality of different training environments; and providing data specifying the selected output reinforcement learning algorithms for controlling actions of a new agent to perform a new task.

19. One or more non-transitory computer storage media storing instructions that when executed by one or more computers cause the one or more computers to perform:

generating a sequence of candidate reinforcement learning algorithms that each have a respective corresponding candidate reinforcement learning neural network, each candidate reinforcement learning algorithm in the sequence being configured to receive an input environment state characterizing a state of an environment and to generate an output that specifies an action to be performed by an agent interacting with the environment, and for each candidate reinforcement learning algorithm, generating respective graph data that represents a computational graph that represents the candidate reinforcement learning algorithm, wherein the computational graph representing the respective candidate reinforcement learning algorithm includes:

a plurality of nodes, each node being associated with a node type selected from a set of node types, the set of node types including:

an input node representing an input to the candidate reinforcement learning algorithm;

a set of parameter nodes each representing a parameter of the candidate reinforcement learning algorithm;

a set of operation nodes each representing an operation in the candidate reinforcement learning algorithm, each operation node being associated with an operation type selected from a list of operation types; and an output node representing an output generated by the candidate reinforcement learning algorithm; and a plurality of directed edges, each directed edge connecting a source node in the plurality of nodes to a receiver node in the plurality of nodes, and passing a node output from the source node to be received as a node input by the receiver node;

wherein: each of the one or more operation nodes receives one or more node inputs from one or more source nodes connected to the operation nodes, and generates one or more node outputs by performing an operation to the node inputs;

wherein one or more of the operation nodes (i) are associated with a neural network operation type and (ii) represent operations of processing node inputs with neural network blocks of the corresponding candidate reinforcement learning neural network; and wherein the output represented by the output node defines a symbolic form of a loss function for optimizing parameter values of the parameters of the candidate reinforcement learning algorithm;

wherein generating the sequence of candidate reinforcement learning algorithms comprises:

initializing the sequence of candidate reinforcement learning algorithms with one or more initial algorithms;

selecting a parent candidate reinforcement learning algorithm from a current sequence of candidate reinforcement learning algorithms;

modifying the computational graph representing the parent candidate reinforcement learning algorithm to generate one or more child computational graphs; and generating one or more child candidate reinforcement learning algorithms respectively from the one or more child computational graphs;

for each candidate reinforcement learning algorithm in the sequence, performing a performance evaluation of the candidate reinforcement learning algorithm, including:

for each training environment in a plurality of different training environments, adjusting a set of environment-specific parameters of the candidate reinforcement learning algorithm by performing training of the corresponding candidate reinforcement learning neural network to control a corresponding agent in the training environment, and generating an environment-specific performance metric for the candidate reinforcement learning algorithm that measures a performance of the candidate reinforcement learning algorithm in controlling the corresponding agent in the training environment as a result of the training;

selecting one or more output reinforcement learning algorithms from the sequence of candidate reinforcement learning algorithms based on the environment-specific performance metrics of the candidate reinforcement learning algorithms for the plurality of different training environments; and providing data specifying the selected output reinforcement learning algorithms for controlling actions of a new agent to perform a new task.

* * * * *